Jan. 13, 1970  J. W. KICE  3,489,178
DIVERTER VALVE
Filed March 11, 1966  3 Sheets-Sheet 1

INVENTOR.
JACK W. KICE
BY
John H. Widdowson
ATTORNEY

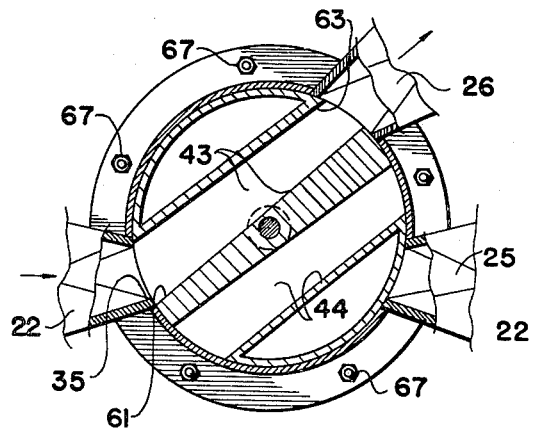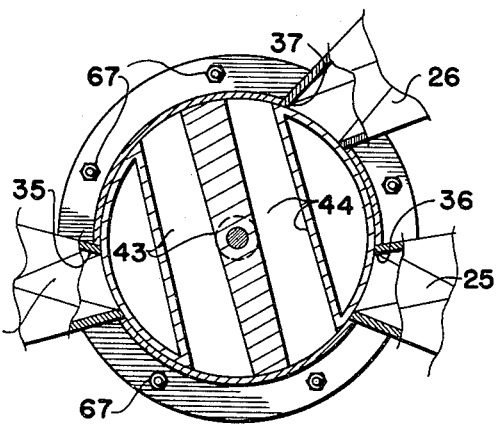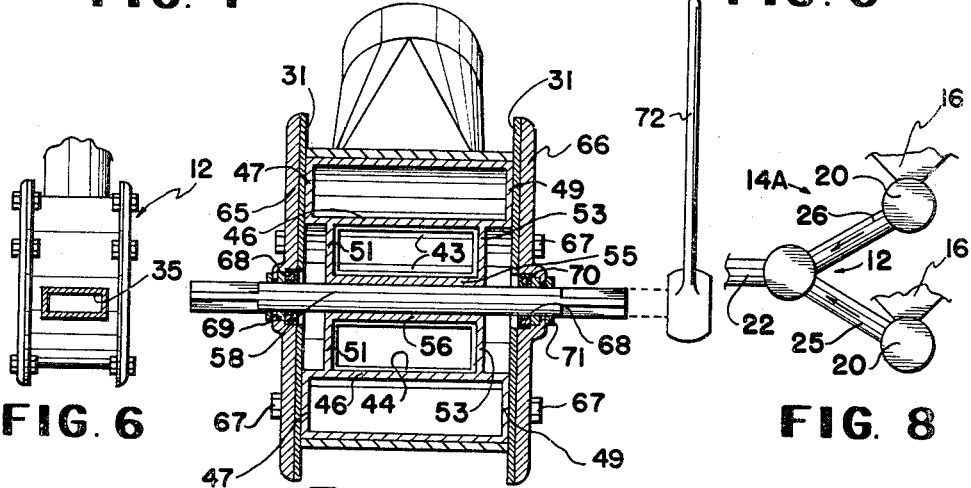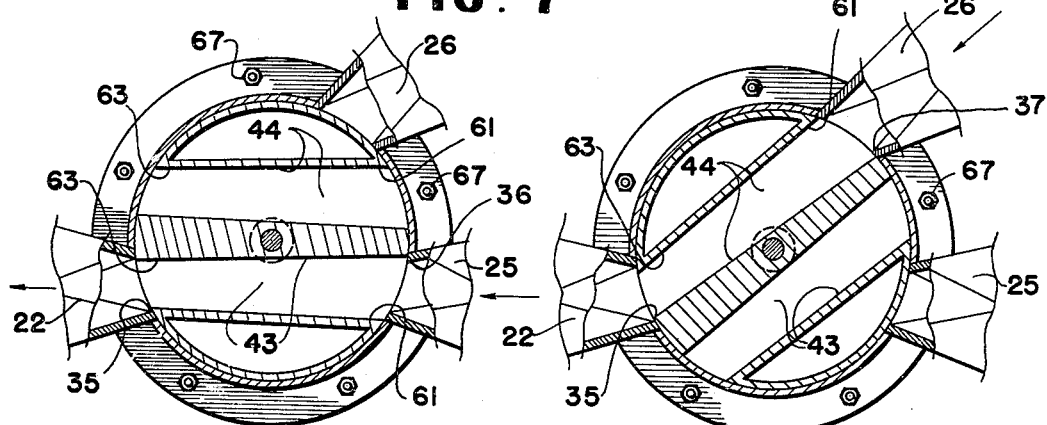

Jan. 13, 1970
J. W. KICE
3,489,178
DIVERTER VALVE
Filed March 11, 1966
3 Sheets-Sheet 3
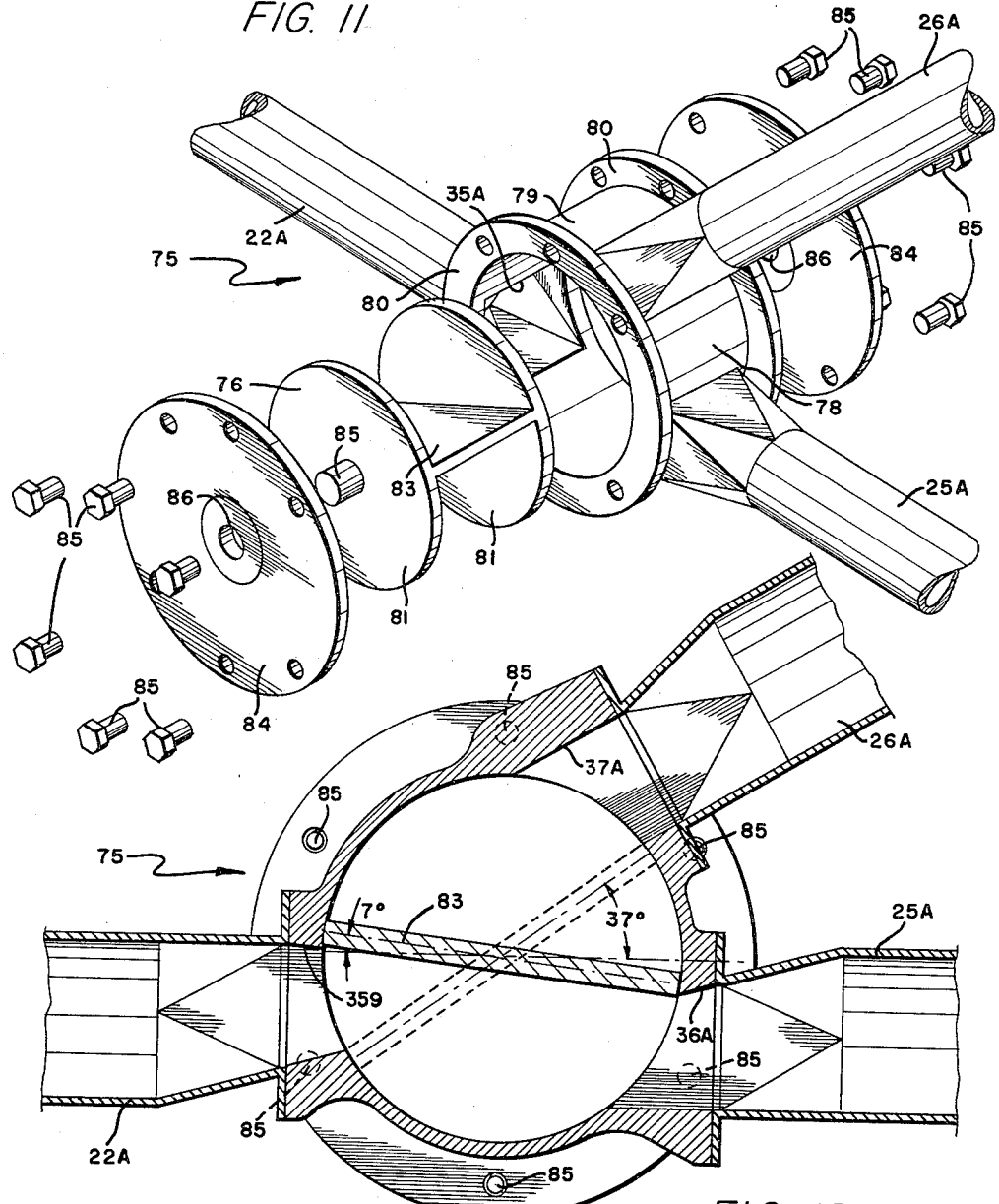
INVENTOR.
JACK W. KICE
BY
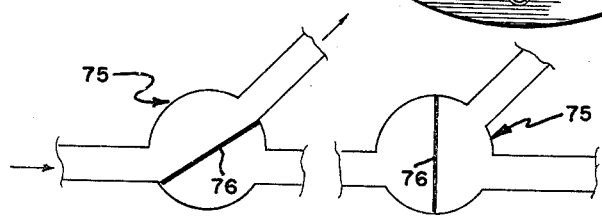
ATTORNEY United States Patent Office 3,489,178
Patented Jan. 13, 1970

3,489,178
DIVERTER VALVE
Jack W. Kice, Wichita, Kans., assignor to K-B Engineering Company, Wichita, Kans., a firm
Filed Mar. 11, 1966, Ser. No. 533,531
Int. Cl. B65g 53/06, 53/56; F16k 11/08
U.S. Cl. 137—625.41                    7 Claims

ABSTRACT OF THE DISCLOSURE

This invention is a value means to selectively divert inlet material to a plurality of outlets with a minimum of valve member rotation. Still, more particularly, this invention is a valve member selectively rotatable from a closed position to one of two discharged paths or rotatable 180° to carry the material flow in the opposite direction direction having inter-related sizes of flow channels and inlet and outlet openings so as to prevent material buildup. Still, more specifically, this invention is a valve member having adjacent flow conveyance channels provided with tapered sidewalls so as to assure smooth uninterrupted flow of material.

Various types of diverter valve means are known to the prior art and include valve means which require a locking means to hold the valve in the selected position, and are restricted to fluid flow from one direction only through the valve. The prior art devices are structurally complicated in many instances, requiring costly manufacturing processes, and in other instances, require a great many of individual parts and means for interconnecting the same in order to obtain the desired function. Furthermore, the prior art devices do not achieve a plurality of novel directional variations whereby the inlet and outlet of the valve means is reversible thereby presenting a plurality of choices of direction of material flow therethrough.

In accordance with the present invention, a new diverter valve means for material flow system such as used in grain milling plants and the like is provided to receive air and material mixtures such as grain, flour, etc. from a supply hopper through a blower motor which propels the material through an inlet pipe towards the diverter valve means of this invention.

The diverter valve means includes a valve housing securable in use to an inlet pipe and having second and third outlet pipe members or means securable on opposite sides thereof. A rotatable valve member is mounted within the valve housing and has a transverse shaft extended laterally of the valve housing. The valve member has a pair of transverse conveyance openings or grain channels extending transversely thereof having adjacent inlet and outlet ends, respectively. The pair of conveyance openings have slightly converging sidewalls tapered inwardly from the inlet ends towards the outlet ends. The valve members are rotatable to a first position wherein the inlet end of one conveyance opening is aligned with a pipe opening of the inlet or first pipe means and the outlet end of this conveyance opening means is aligned with a pipe opening of the second pipe means. The pipe openings of the first, second and third pipe means are of a size intermediate the actual size of the inlet and outlet ends of the valve member whereby material fluid flow from the first pipe means through the one conveyance of the valve member and into the second pipe means presents a continuous smooth flow without any possibility of material build up. The valve member is selectively rotatable to interconnect the first pipe means and the third pipe means whereby fluid flow in this direction is provided without any hinderance or material buildup. The valve member is also rotatable approximately 180 degrees whereby the inlet ends of the conveyance openings are selectively movable into aligned position with the second and third pipe means whereby it is possible to supply material flow through the second and third pipe means into the valve means to exit through the first pipe means thereby providing for selective material movement in any direction through the valve member. It is seen also that the valve member is movable to a closed or non-flow position wherein the pipe openings of the first, second and third pipe means are closed by solid areas of the valve member. It is seen that this invention relates to a new and novel multiple directional diverter valve means which is simple to operate and manufacture providing effective and efficient results, and free of material buildup and any obstruction to flow.

Accordingly, it is an object of this invention to provide a new diverter valve means for a material conveyance system.

Another object of the invention is to provide a new valve means which is rotatable relative to a plurality of pipe members connected thereto to selectively divert and control movement of material therethrough.

Still another object of the invention is to provide an improved diverter valve means having tapered conveyance channels whereby material flow therewithin is unrestricted for smooth continuous flow without material buildup.

One other object of this invention is to provide a diverter valve means having a rotatable plate member operable to selectively direct material flow into one of two outlet channels.

Another object of this invention is to provide a diverter valve means providing for material flow from an inlet pipe member selectively to one of two pipe members and rotatable so that fluid flow might be directed from one of the outlet pipe members to the inlet pipe member, and, additionally, the valve may be rotated to a non-flow or closed position.

A further object of this invention is to provide a diverter valve means that is simple to use, economical to manufacture, and relatively simple in operation.

Still a further object of this invention is to provide a diverter valve means that is of light weight construction, easily movable into one of a plurality of material flow positions, and substantially equally balanced thereby providing for a rigid, stable valve when in one of the selected flow positions.

Various other objects, advantages and features of the invention will become apparent to those skilled in the art from the following discussion, taken in conjunction with the accompanying drawings which:

FIG. 4 is a view similar to FIG. 3 illustrating a second adjusted position of the valve means;

FIG. 5 is a view similar to FIG. 3 illustrating the valve means in a closed position;

FIG. 6 is a sectional view taken along line 6—6 in FIG. 1;

FIG. 7 is a sectional view taken along line 7—7 of FIG. 2;

FIG. 8 is a fragmentary elevation view of a second material supply system embodying the diverter valve means of this invention;

FIG. 9 is a view similar to FIG. 3 illustrating the valve means in a third material flow position;

FIG. 10 is a view similar to FIG. 3 illustrating valve means in a fourth material flow position;

FIG. 11 is an exploded perspective view of another embodiment of a diverter valve means of this invention connected to inlet and outlet pipe members;

FIG. 12 is an enlarged sectional view of the other embodiment of this invention; and FIGS. 13 and 14 are schematic diagrams illustrating the other embodiment of the valve means of this invention in a second material flow and a closed position, respectively.

Figure 1:
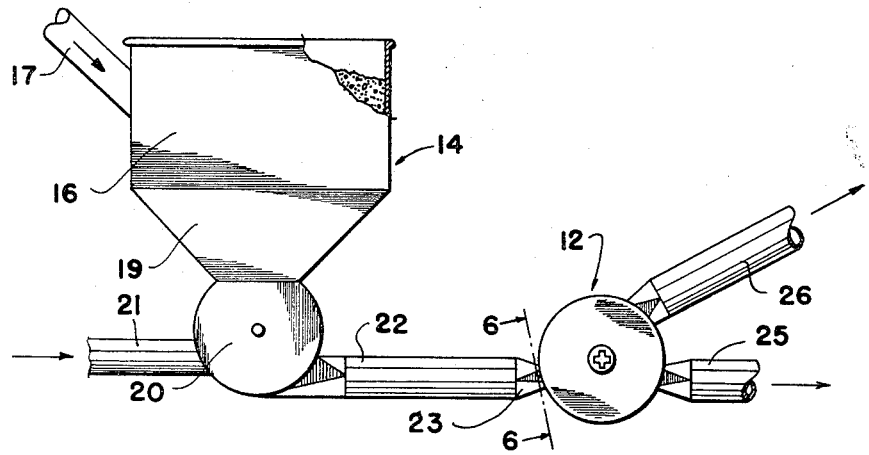
FIG. 1 is an elevational view of a material supply system embodying the diverter valve means of this invention.

The following is a discussion and description of preferred specific embodiments of the new valve means of the invention, such being made with reference to the drawings whereon the same reference numerals are used to indicate the same or similar parts and/or structure. It is to be understood that such discussion and description is not to unduly limit the scope of the invention.

Referring to the darwings, and more particularly to FIG. 1 a multidirectional or diverter valve means of this invention, indicated generally at 12 is shown in combination with a material supply system 14. More specifically, the system 14 consists of a supply hopper 16 having an inlet line 17 adjacent the upper end thereof and a lower discharge section 19 operably connected to a blower 20 which is driven by a motor (not shown). An air lock inlet 21 provides for mixing and smooth flow of material within the hopper 16 through the blower 20. The outlet side of the blower 20 is secured to a transfer pipe line or first pipe means 22 having an inlet section 23 secured to the diverter valve means 12. A second and third pipe means or outlet pipe means 25 and 26 respectively, are secured to the diverter valve means 12.

In operation, the supply system 14 transfer a mixture of air and grain, flour, and the like from the hopper 16 through the first pipe means 22 and through the diverter valve means 12. The material flow is selectively diverted within the valve means 12 for conveyance through either the second or third pipe means 25 and 26.

Figure 2:
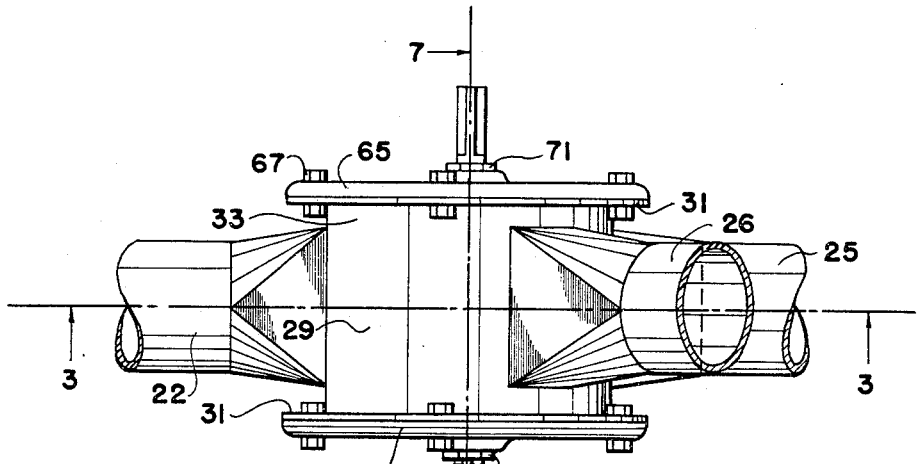
FIG. 2 is an enlarged top plan view of the diverter valve means of this invention connected to inlet and outlet pipe members.
Figure 3:
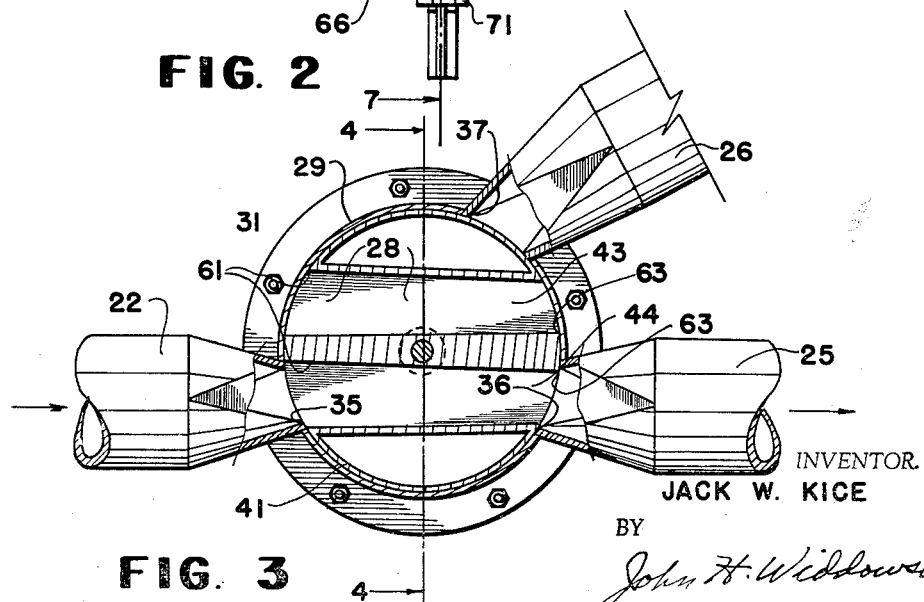
FIG. 3 is a sectional view taken along line 3—3 in FIG. 2.

More particularly, as shown in FIGS. 2 and 3, the diverter valve means 12 consists of a valve member 28 rotatably within a valve housing 29. The valve housing 29, illustrated as constructed of a sheet metal material, includes a pair of parallel end walls 31 interconnected as by welding to a cylindrical base wall 33. The base wall 33 has three angularly spaced openings 35, 36 and 37 of rectangular shape to which are connected the first, second, and third pipe means 22, 25 and 26 respectively. The pipe means consist of conventional tubular conduit piping having shaped tapered ends of rectangular shape in transverse cross section which are welded to the respective one of the openings 35, 36 and 37, hereinafter referred to as housing or conduit means openings. It is seen, therefore, that the pipe means 22, 25 and 26 and the valve housing 29 cooperate to form a rigid, enclosed material conveyor structure.

As shown in FIGS. 3 and 7, the rotatable valve member 28 includes a cylindrical inner wall 41 mounted within the base wall 33 in slidable, snug engagement therewith. A pair of conveyance openings or channels 43 and 44 extend transversely of the inner wall 41 with the respective outer sidewalls 46 extended laterally and welded to arcuate vertical supports 47 and 49 secured to the inner wall 41. The conveyance channels 43 and 44 are of a rectangular shape in transverse cross section having parallel upright walls 51 and 53, secured to inner sidewalls 55 and 56, respectively. The inner sidewalls 55 and 56 are rigidly secured as by welding to a centrally positioned shaft 58 having opposite ends extended laterally outward and rotatably mounted in the end walls 31. The conveyance channels 43 and 44 are substantially identical having the sidewalls converging inwardly from inlet openings 61 towards outlet openings 63 thereby presenting tapered or gradually funnel-shaped discharge passageways.

As shown in FIG. 7, the valve housing 29 further includes a pair of circular bearing plates 65 and 66 rigidly secured to the end walls 31, respectively, by a plurality of bolt members 67 about the outer periphery thereof. The bearings plates 65 and 66 have central stepped openings 68 positionable about the shaft 58 and a bearing 69 mounted in an outer step of the openings 68 permitting rotational movement of the valve member 28 within the housing 29. An O-ring seal 70 is mounted within each second step of the openings 68 to prevent air and material leakage from the diverter valve means 12 and maintain lubricant in the bearings 69. Lock rings 71 secured to opposite ends of the shaft 58 as by set screws hold the bearings 69 and the centrally positioned, rotatable valve member 28 in the assembled position. It is seen therefor, that the shaft 58 is rotatable by a lever arm 72 about its axis to rotate the valve member 28 within the valve housing 29 to selectively align certain ones of the inlet and outlet openings 61 and 63 of a selected conveyance channel with the first, second, and third pipe means openings 35, 36 and 37. Additionally, it is obvious that the valve member 28 can be held in the selected position by any conventional locking method such as a pin, lock nut or by a hydraulic cylinder which may be used to rotate the valve member 28 to a selected position.

In the use and operation of the diverter valve means 12, the valve member 28 is rotatable to a first position, as shown in FIG. 3, wherein the inlet and outlet openings 61 and 63 of the conveyance channel 44 are aligned and adjacent the first and second pipe openings 35 and 36, respectively. As shown in FIGS. 6 and 7 the pipe openings 35, 36, and 37 are substantially identical in shape to the inlet and outlet openings 61 and 63 but of a size intermediate thereof. Therefore, with the valve means 12 in the first position, the air and material flow from the blower 20 is readily movable through the conveyor channel 44 similar to a funnel flow without any possibility of restriction or hinderance of flow by material buildup on laterally projected surfaces.

The valve member 28 is rotatable counterclockwise, as viewed in FIG. 3, to the second position shown in FIG. 4 wherein the material flow is diverted from the first pipe means 22 upwardly through the other converging conveyance channel 43 for discharge through the third pipe means 26. It is seen that the previously described relationship of the inlet, outlet, and pipe openings results in a smooth material flow through the valve means 12. The valve member 28 is further rotatable counterclockwise to the closed or non-flow position as shown in FIG. 5 wherein all of the pipe means openings are closed by solid portions of the inner wall 41. This position is extremely beneficial in providing a positive discharge stopping means.

As previously discussed, it is also possible to assemble a second material supply system 14a wherein a blower 20 is connected to each of the second and third pipe means 25 and 26, respectively, to supply air and material to the diverter valve 12 from a supply hopper 16 with material discharge through the first pipe means 22 (FIG. 8).

With this particular material supply system 14a, the valve member 28 may be rotated to the third position as shown in FIG. 9 wherein the conveyance openings 43 is aligned with the first and second pipe means openings 35 and 36. In this position, the inlet opening 61 is aligned with the second pipe means opening 36 thereby providing the inwardly taper in the direction of material flow to assure smooth operation thereof.

Additionally, the valve member 28 is rotatable to a fourth position as shown in FIG. 10 wherein the conveyance opening 44 is aligned with the first and third pipe means openings 35 and 37 for material flow therethrough from the third pipe means 26 to the first pipe means 22.

In another preferred embodiment of the invention, as illustrated in FIGS. 11–14, inclusive, a diverter valve means 75 has a valve member 76 rotatable within a rigid, cast housing 78 of cylindrical shape. The housing 78 has a main body 79 with opposite angular ends integral with support flanges 80. The main body 79 has three spaced openings 35a, 36a, and 37a to which are secured as by welding, bolts, or the like first, second, and third pipe means 22a, 25a, and 26a, respectively.

As shown in FIG. 11, the valve member 76 consists of a pair of parallel disc members 81 interconnected by a diverter plate member 83 extended diametrically of the disc members 81. Centrally of each disc member 81 extended outwardly therefrom are stub shafts 85.

In the assembly of the valve means 75, the valve member 76 is mounted within the housing 78 and secured against axial movement by plates 84 secured to the support flanges 80 as by bolts 85. It is seen that the stub shafts 85 extend outwardly of the plates 84 through holes 86 whereby the shafts 85 are rotatable to select the desired position of the valve member 76 for reasons to become obvious.

In the use and operation of the valve means 75 as shown in FIG. 12, the valve member 76 is rotatable to a first position wherein the plate member 81 acts to divert material flow from the first pipe means 22a into the second pipe means 25a. It is seen that the outer edges of the plate member 81 extends inwardly and outwardly of the openings 35a and 36a, respectively, to prevent material buildup on flow therethrough.

In FIG. 13 is illustrated a second material flow position whereupon the plate member 81 diverts material upwardly from the first pipe means 22a into the third pipe means 26a with the same smooth unrestricted material flow. The positioning and shaping of the adjacent portions of the pipe means 22a, 25a, and 26a and the openings 35a, 36a, and 37a, respectively, are correlated so that the valve member 76 need only be rotated 44 degrees in changing from the first position to the second position to maintain an unrestricted material flow. As noted in FIG. 12, this feature is desirable in that material flowing from the first pipe means 22a into the third pipe means 26a is only changed direction a maximum of 37 degrees so as to provide a smooth somewhat arcuate movement of the material.

As shown in FIG. 14, the valve member 76 is rotatable to a third "closed" position to prevent material movement through the valve means 75. It is obvious that the direction of material flow can be similarly reversed as described in use and operation of the valve means 12.

It is seen that the valve means 75 provides a sturdy valve of simplified construction that is easy to use, reliable in operation, and economical to manufacture.

It is seen therefor that the diverter valve means of this invention provides a multi-directional valve that is simple to use, economical to manufacture, and substantially maintenance free. It is obvious to one skilled in the art that the valve of this invention can be made of any type material, shape and size and could readily be constructed by casting the valve member as a single unit for rigidity. Applicant's construction eliminates a great deal of time consuming and tedious work involved in changing the directional flow of material therethrough.

I claim:

1. A valve apparatus for selectively controlling flow of material therethrough, comprising:
    (a) a valve housing,
    (b) a valve member rotatably mounted within said valve housing, said valve member having a pair of conveyance channels extended therethrough,
    (c) said conveyance channels having adjacent inlet ends and outlet ends, respectively, said inlet ends having a cross-sectional area greater than said outlet ends.
    (d) said valve housing having first and second pipe openings, said first and second pipe openings each having a cross-sectional area intermediate the respective areas of said inlet ends and said outlet ends,
    (e) means for supplying material flow to said first or said second pipe openings, and
    (f) means for rotating said valve member to a first position whereby the material is supplied through said first pipe opening and into the inlet end of one of said conveyance channels for discharge into said second pipe opening without material build-up.

2. A valve apparatus as described in claim 1, wherein:
    (a) said valve member is rotatable to a second position with the other one of said conveyance channels aligned with said first and second pipe openings whereby material is supplied by said supply means through said second pipe opening and into the inlet end of said other conveyance channel for discharge into said first pipe opening without material buildup.

3. A valve apparaus as described in claim 1, wherein:
    (a) said conveyance channels each have sidewalls converging from said inlet ends toward said outlet ends.

4. A valve apparatus as described in claim 1, including:
    (a) a third pipe means secured to said valve housing having a third pipe opening,
    (b) said valve member is rotatable to a third position with said inlet and outlet ends of the said other one of the conveyance channels adjacent said first and third pipe openings, respectively, whereby material supplied by said supply means flows from said first pipe opening through said third pipe opening, and
    (c) said first, second, and third pipe openings of a size intermediate the size of said inlet and outlet ends of said conveyance channels thereby assuring smooth flow therethrough in any direction on proper positioning of said valve member.

5. A valve apparatus as described in claim 4, wherein:
    (a) said valve member is rotatable to a fourth position with said inlet and outlet ends of said one of the conveyance channels adjacent said third and first pipe means, respectively, whereby material supplied by said supply means flows from said third pipe opening through said first pipe opening without material build-up.

6. A valve apparatus for selectively controlling flow of material therethrough, comprising:
    (a) a substantially circular valve housing,
    (b) a valve member rotatably mounted within said valve housing having a plate member to direct material flow,
    (c) said valve housing having first, second and third pipe openings, said second and third openings being approximately 45° apart,
    (d) means for supplying material flow to said first or said second pipe openings,
    (e) said plate member is rotatable to a first position to direct material flow from said first pipe opening to said second pipe opening without an abrupt change in direction, to a second position to prevent material flow therebetween, and to a third position to direct material flow from said first pipe opening to said third pipe opening in substantially a straight line, and
    (f) said plate member is rotatable less than forty-five degrees on movement from said first position to said third position, and said plate member being positionable to prevent flow through said valve apparatus.

7. A valve apparatus as claimed in claim 6, wherein:
    (a) said plate member is rotatable from said first position to said third position in order to direct material therebetween with the material deflected a maximum of 37° on movement from said first pipe opening to said second and third pipe openings.

(References on following page)

References Cited

UNITED STATES PATENTS

| | | | |
|---|---|---|---|
| 215,928 | 5/1879 | Hutchinson | 137—625.19 |
| 616,827 | 12/1898 | Deisher | 137—608 |
| 810,863 | 1/1906 | Hofstatter | 137—625.19 |
| 1,059,485 | 4/1913 | Orlopp | 137—625.47 |
| 1,854,727 | 4/1932 | Alkire | 251—309 |
| 3,006,367 | 10/1961 | Thompson et al. | 137—610 |
| 3,165,096 | 1/1965 | Langdon | 137—625.19 |
| 3,191,628 | 6/1965 | Kirkwood et al. | 137—625.33 |

FOREIGN PATENTS 393,517   6/1923   Germany.

M. CARY NELSON, Primary Examiner

WILLIAM R. CLINE, Assistant Examiner

U.S. Cl. X.R.

137—625.47; 251—309